(12) United States Patent
Chapman

(10) Patent No.: US 8,702,327 B2
(45) Date of Patent: Apr. 22, 2014

(54) TELESCOPING CAMERA CRANE

(75) Inventor: Leonard T. Chapman, North Hollywood, CA (US)

(73) Assignee: Chapman/Loenard Studio Equipment, Inc., North Hollywood, CA (US)

( * ) Notice: Subject to any disclaimer, the term of this patent is extended or adjusted under 35 U.S.C. 154(b) by 66 days.

(21) Appl. No.: 13/350,217

(22) Filed: Jan. 13, 2012

(65) Prior Publication Data

US 2013/0183028 A1    Jul. 18, 2013

(51) Int. Cl.
*G03B 17/00* (2006.01)

(52) U.S. Cl.
USPC .............................................. 396/428

(58) Field of Classification Search
USPC .............................................. 396/428
See application file for complete search history.

(56) References Cited

U.S. PATENT DOCUMENTS

| | | | | |
|---|---|---|---|---|
| 3,788,585 | A | * | 1/1974 | Masseron ................. 248/178.1 |
| 4,907,768 | A | * | 3/1990 | Masseron et al. ........ 248/123.11 |
| 5,697,757 | A | * | 12/1997 | Lindsay ..................... 414/744.6 |
| 6,345,919 | B1 | | 2/2002 | Chapman |
| 6,776,488 | B2 | | 8/2004 | Burbulla |
| 7,121,745 | B2 | | 10/2006 | Chapman |
| 7,128,479 | B2 | | 10/2006 | Chapman |
| 8,033,742 | B1 | | 10/2011 | Chapman |
| 2003/0161622 | A1 | * | 8/2003 | Zantos ......................... 396/419 |
| 2005/0191050 | A1 | * | 9/2005 | Chapman ...................... 396/428 |
| 2005/0231634 | A1 | * | 10/2005 | Chapman ...................... 348/373 |
| 2007/0058968 | A1 | | 3/2007 | Chapman |
| 2007/0230947 | A1 | | 10/2007 | Chapman |
| 2009/0097840 | A1 | * | 4/2009 | Amadril et al. ............... 396/428 |
| 2010/0038333 | A1 | | 2/2010 | Conrad |

FOREIGN PATENT DOCUMENTS

WO     2011017670 A1     2/2011

OTHER PUBLICATIONS

Korean Intellectual Property Office, International Search Report and Written Opinion for PCT/US2013/020773, Apr. 25, 2013.

* cited by examiner

*Primary Examiner* — Clayton E Laballe
*Assistant Examiner* — Linda B Smith
(74) *Attorney, Agent, or Firm* — Kenneth H. Ohriner; Perkins Coie LLP

(57) ABSTRACT

In a telescoping camera crane arm, a second section is telescopically extendible into and out of the first section. The second section divided into a front segment attached to a back segment by a connector, to allow the front segment to be removed from the back segment. An adapter is attachable to the front end of the first section. A camera support attachable to the adapter and to the front end of the front segment. To configure the crane for increased maximum payload, the front segment is removed from the back segment. The adapter is attached to the front end of the front section, and the camera support is attached to the adapter, so that the camera support is then supported directly by the first section. A spring balancing system compensates for out-of-balance forces associated with changes in the elevation angle of the crane arm.

21 Claims, 19 Drawing Sheets

TELESCOPING CAMERA CRANE

BACKGROUND

The field of the invention is camera cranes. Camera cranes are often used in motion picture and television production. The motion picture or television camera is typically mounted on a crane arm supported on a mobile base, dolly, or truck. Camera cranes generally have a crane arm supported on a base, with a camera platform at one end of the arm, and a counter weight at the other end. The crane arm can be pivoted by hand to raise and lower the camera, and also to pan to the left or right side.

Telescoping camera cranes have a telescoping arm that can extend and retract, providing far more capability than fixed length crane arms. U.S. Pat. No. 8,033,742, incorporated herein by reference, describes a camera crane having four telescoping sections providing collective telescoping extension movement of about 60 feet. The camera platform is attached to the front end of the fourth telescoping section, with the crane having a maximum payload of about 230 pounds. The maximum payload rating is determined based on load that the arm can safely support, when the arm is fully telescopically extended and bending moments on the arm are at maximum values. Although in some applications the full 60 feet of telescoping movement may not be needed or used, the maximum payload remains unchanged. Accordingly, it would be advantageous to provide a telescoping crane that can be quickly reconfigured to carry a higher maximum payload.

It is well known that due to changes in the amount of bending deflection of the camera crane arm, as the arm elevation is changed, arm balancing cannot be achieved purely via fixed counterweights. This occurs because the arm is never perfectly straight (unless it is in a purely vertical orientation). Rather, the arm is flexed slightly into an arc, with the most curvature occurring when the arm is horizontal. The centers of gravity of the payload and counterweights therefore change slightly as the elevation angle changes. For example, a camera crane arm may be balanced by adding counterweights during initial set up when the arm is in the horizontal position and bending deflection is at a maximum. However, as the arm is raised to elevate the camera, bending deflection decreases, bringing the arm out of balance and making the arm back-end heavy. Consequently, holding the arm steady then requires significant upward force at the back end of the arm, typically achieved via the crane operators pushing up on the back end of the arm. If the arm is lowered from a balanced horizontal position, the arm becomes back-end light, and requires the crane operators to pull down on the back end of the arm to hold the arm in position. With smaller camera cranes these out-of-balance forces can be compensated for by the crane operator(s). With larger camera cranes however, the out-of-balance forces can make it considerably more difficult to precisely control the crane arm movement and positioning. Accordingly, it is also an object of the invention to provide an improved camera crane arm having a system for better maintaining the camera crane arm in a balanced condition.

SUMMARY OF THE INVENTION

In a new telescoping camera crane, a second section is telescopically extendible into and out of the first section. The second section divided into a front segment attached to a back segment by a connector, to allow the front segment to be removed from the back segment. An adapter is attachable to the front end of the first section. A camera support attachable to the adapter and to the front end of the front segment. To configure the crane for increased maximum payload, the front segment is removed from the back segment. The adapter is attached to the front end of the front section, and the camera support is attached to the adapter, so that the camera support is then supported directly by the first section.

In a second and separate aspect, a spring assembly is provided on a bottom surface of a first tube of a camera crane. The spring assembly typically includes several springs. A cable may be attached at each side of the spring assembly, with the cable extending around an idler or a rotatable pulley on the bottom surface of the first tube and attached to the pedestal. The cables may have a vertical segment between the pedestal and the pulley, and a horizontal segment between the pulley and the bar, when the first tube is horizontal. The spring assembly exerts torque on the arm that compensates for out-of-balance forces.

BRIEF DESCRIPTION OF THE DRAWINGS

In the drawings, wherein the same reference number indicates the same element in each of the views.

DETAILED DESCRIPTION OF THE DRAWINGS

Figure 1:
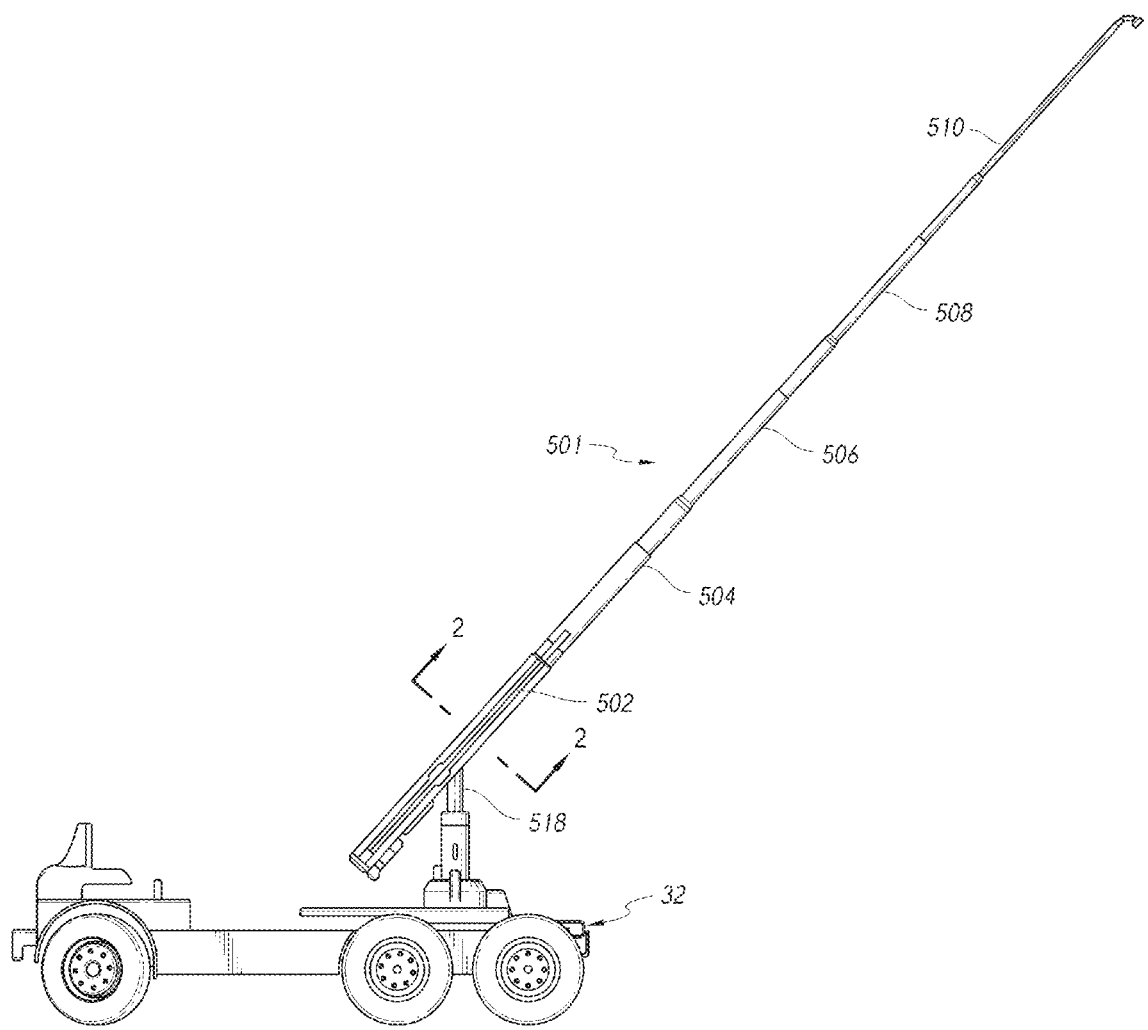
FIG. 1 is a side view of the present telescoping camera crane mounted on a vehicle or mobile base.

Turning now in detail to the drawings, as shown in FIG. 1, a telescoping crane arm 501 is mounted onto a mobile base 32. The mobile base 32 may be a truck or road vehicle, or a motorized special purpose camera crane base or dolly. Typically, the mobile base 32 will have wheels 34 which drive and steer the mobile base. Four-wheel drive and four-wheel steering may be provided. For smaller scale cranes 30, e.g., up to about 15 feet, the mobile base 32 may be unmotorized, and may be moved or pushed by hand. For larger versions of the telescoping crane 501, or when required due to ground conditions or other use requirements, the mobile base 32 can have electric motors, or internal combustion engines, for driving the wheels 34.

Figure 2:
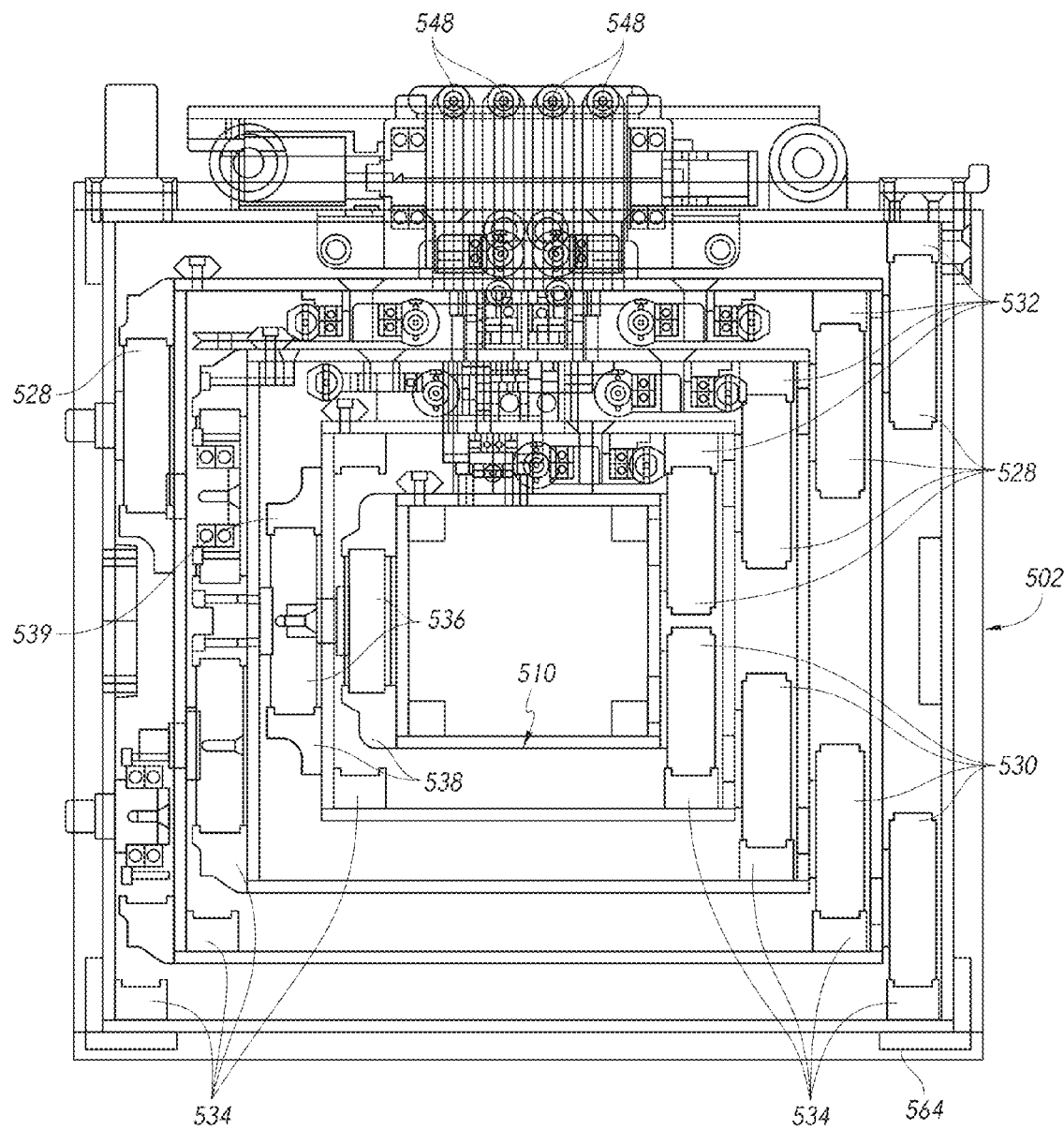
FIG. 2 is a section view taken along line 2-2 of FIG. 1, with certain elements omitted for purpose of illustration.
Figure 3:
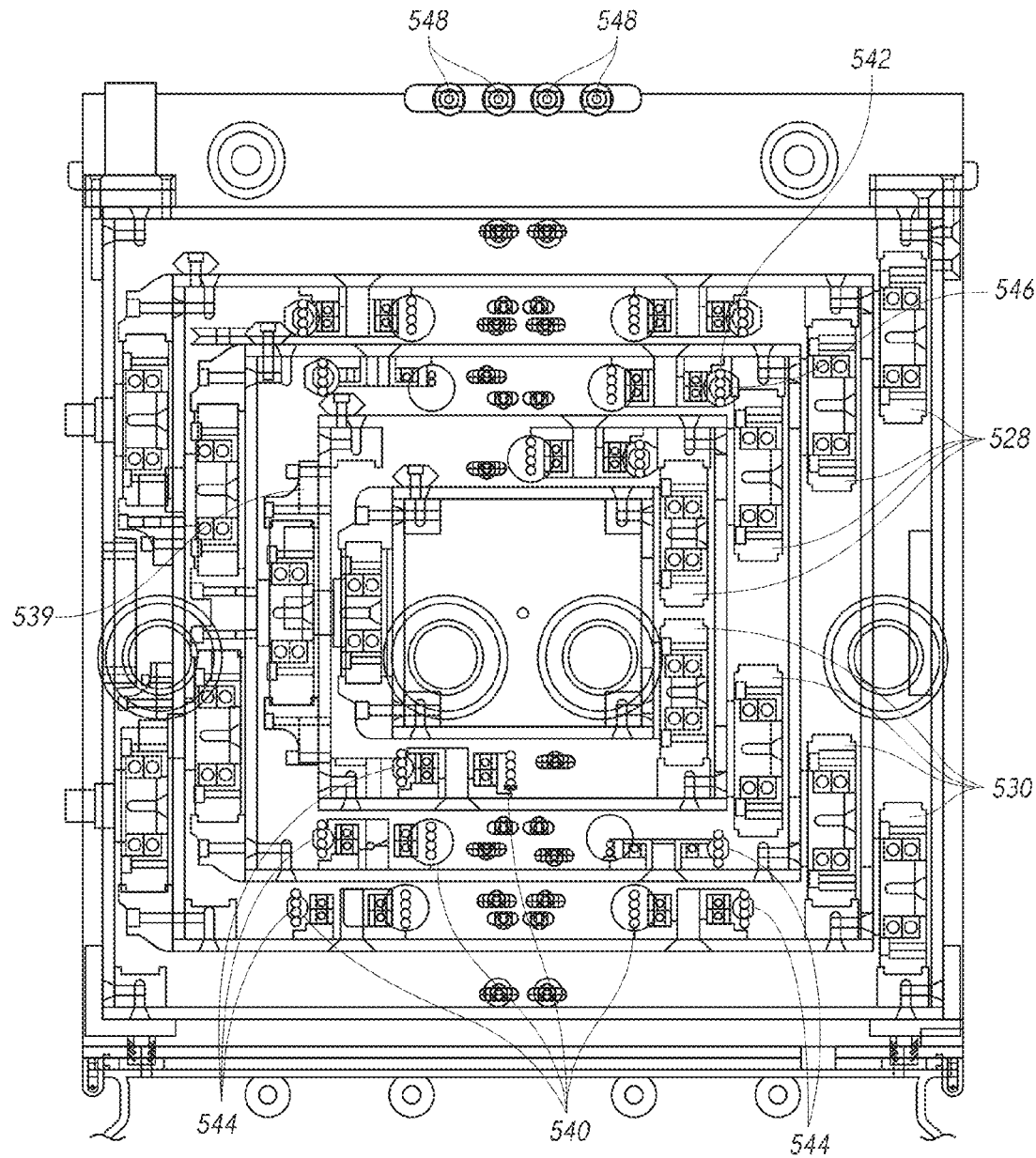
FIG. 3 is a section view taken along line 2-2 of FIG. 1 with additional elements shown.
Figure 4:
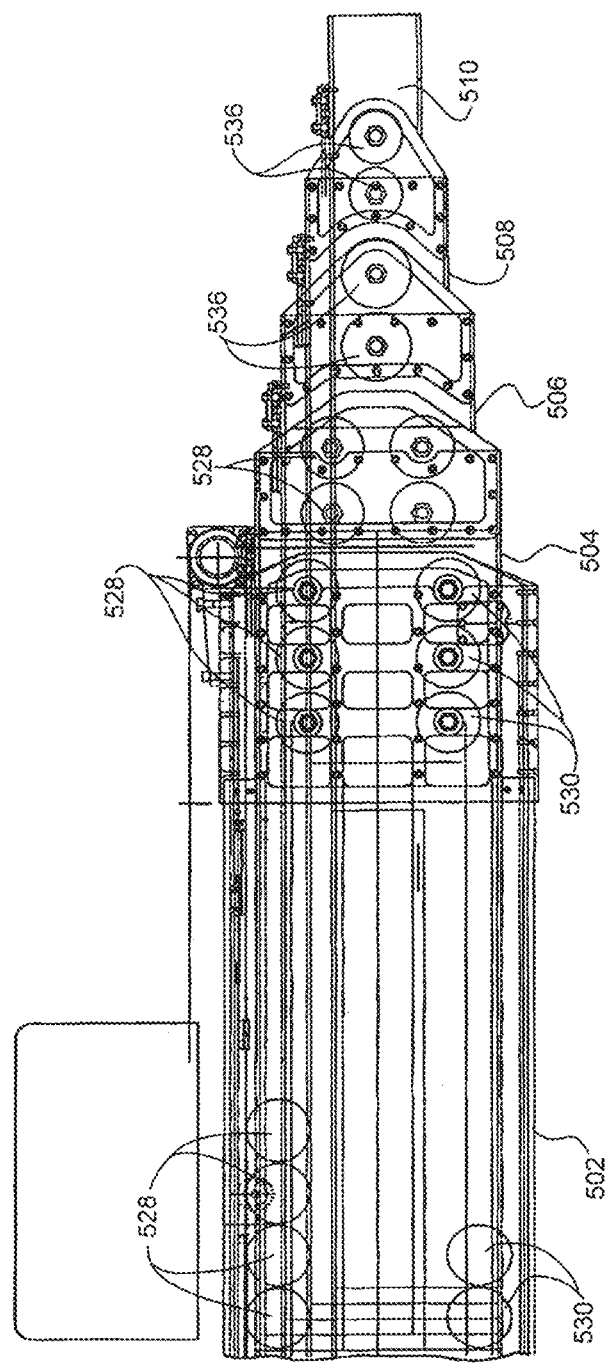
FIG. 4 is a side view of the front end of the crane, in a retracted position.

As shown in FIGS. 2-4, and as described in Referring to FIGS. 2 and 3, and as described in U.S. Pat. No. 8,033,742, the crane arm 501 includes a first or outer section 502 pivotally attached to a column 518 on the base. A second the crane arm design 501 has a first tube or section 502 pivotably supported on a U-frame 518. A second section 504 is telescopically supported in the first section, a third section 506 is telescopically supported in the second section 504, a fourth section 508 is telescopically supported in the third section 506 and a fifth section 510 is telescopically supported in the fourth section 508.

As shown in FIGS. 2 and 3, the first tube 502 may be near square with an approximately 18 inch width or height. The fifth or innermost tube 510 may correspondingly also be near square with a height or width of about 5.62 inches, in the design shown. The tube sections 504-510 are telescopically positioned within each other on upper and lower rear rollers 530 and 532, and front rollers 536. Tracks 532 and 534 may be located at the corners of the tubes 504-510 to further strengthen the tubes. The front rollers 536 rolling on upper and lower front roller tracks 539 and 538, support the front ends of the telescoping tubes 504-510.

In the specific example shown, the tubes 504-510 are each 20 feet long, with about 15 feet of telescopic extension. As a result, the crane arm 501 can provide up to about 60 feet of telescopic movement. The drive system for extending and retracting the arm 501 includes cables 542 and 544 attached to the back end of each of telescoping tubes 504-510.

Figure 5:
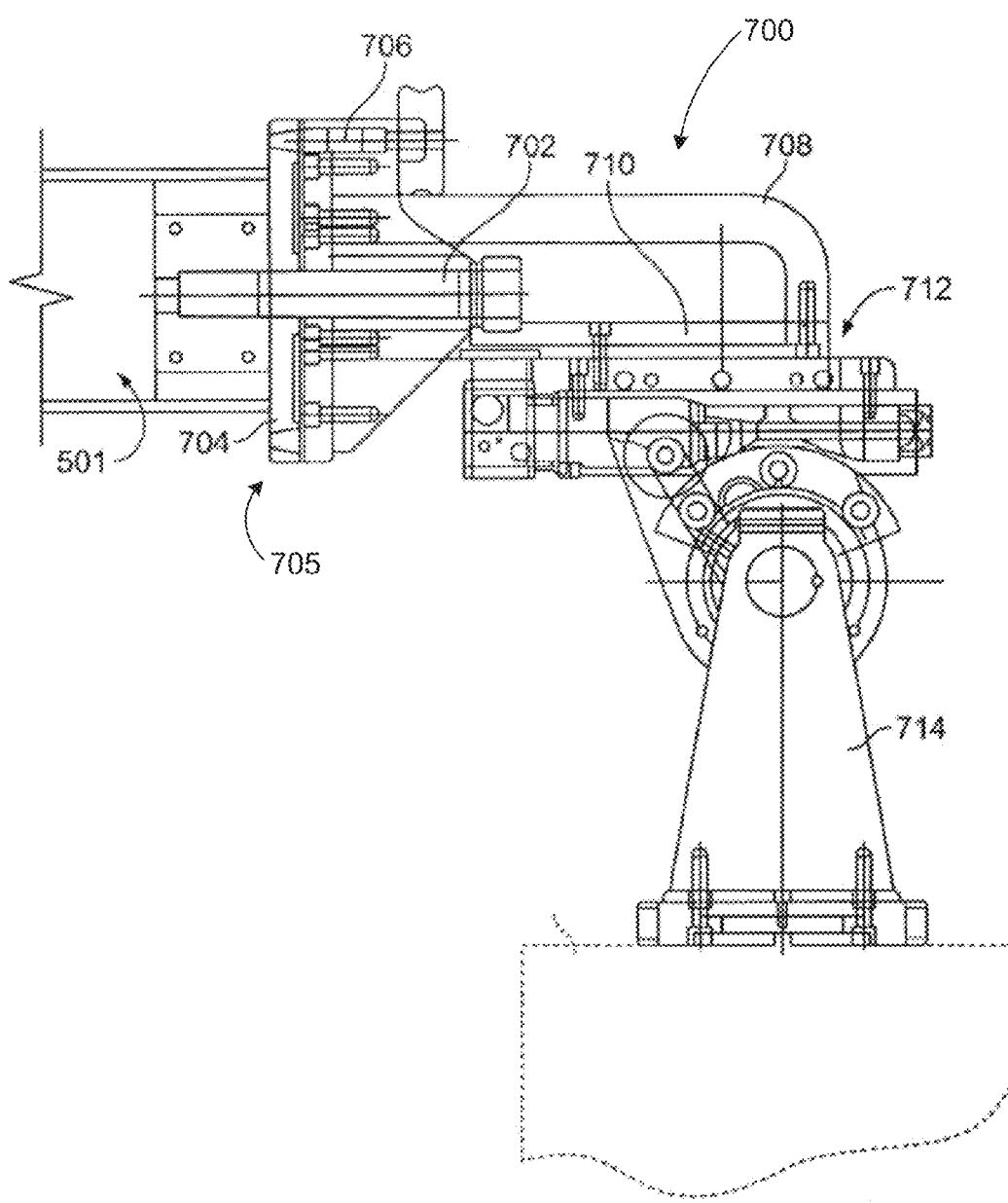
FIG. 5. is a side view of a nose assembly attached to the front end of the fourth or front telescoping section of the crane.

FIG. 5 shows a nose assembly 700 attached to the front end of the fifth section of the crane arm 501. A center plate 704 of the nose assembly 700 is secured onto the end of the fifth section 510 via a center bolt 702. A quick release pin 706 aligns the nose assembly 700 vertically, in an under slung position as shown in FIG. 5. The nose assembly 700 may be moved to an over slung or side slung position by loosening the center bolt 702, temporarily pulling back on the pin 706, and then turning the nose assembly until the pin 706 aligns with another locating hole in the end of the arm. The plate 704 and the bolt 702 provide an attachment fitting 705 for attaching the nose assembly 700 onto the front end of the fifth (or last) tube 510 of the crane arm.

A typical maximum payload for the crane arm as shown would be about 230 pounds with 60 feet of telescopic movement. Depending on the specific use, it may be advantageous to have a camera crane having less telescopic movement, but with greater payload capacity. For example, a filming sequence may require only up to about 45 feet of telescoping movement, but also require a payload of 400 pounds, to support e.g., a heavy camera and a camera operator. FIGS. 6-16 illustrate a camera crane arm that achieves this objective.

Figure 6:
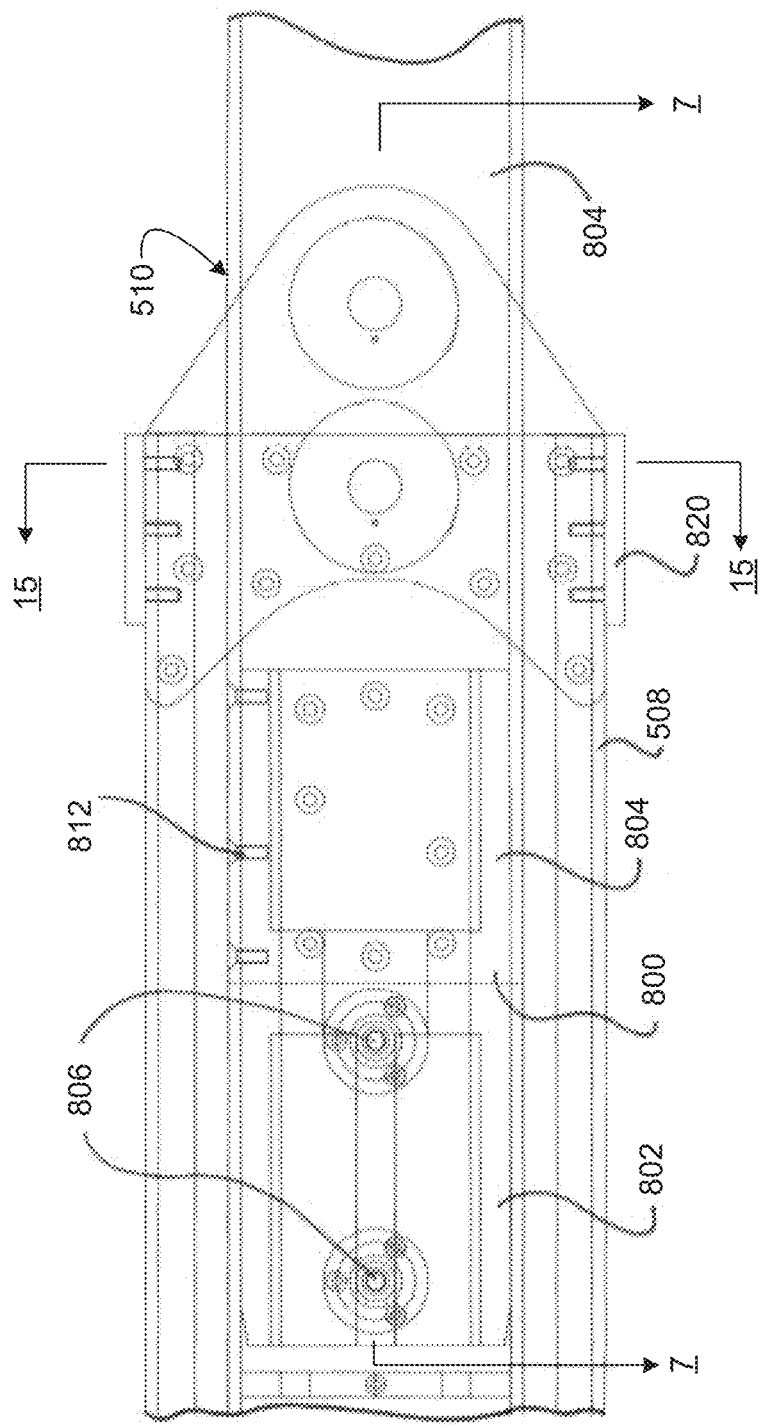
FIG. 6 is an enlarged side view of the nose assembly of FIG. 5 now attached to the front end of the third telescoping section of the crane, providing greater maximum payload with less telescoping reach or movement.
Figure 8:
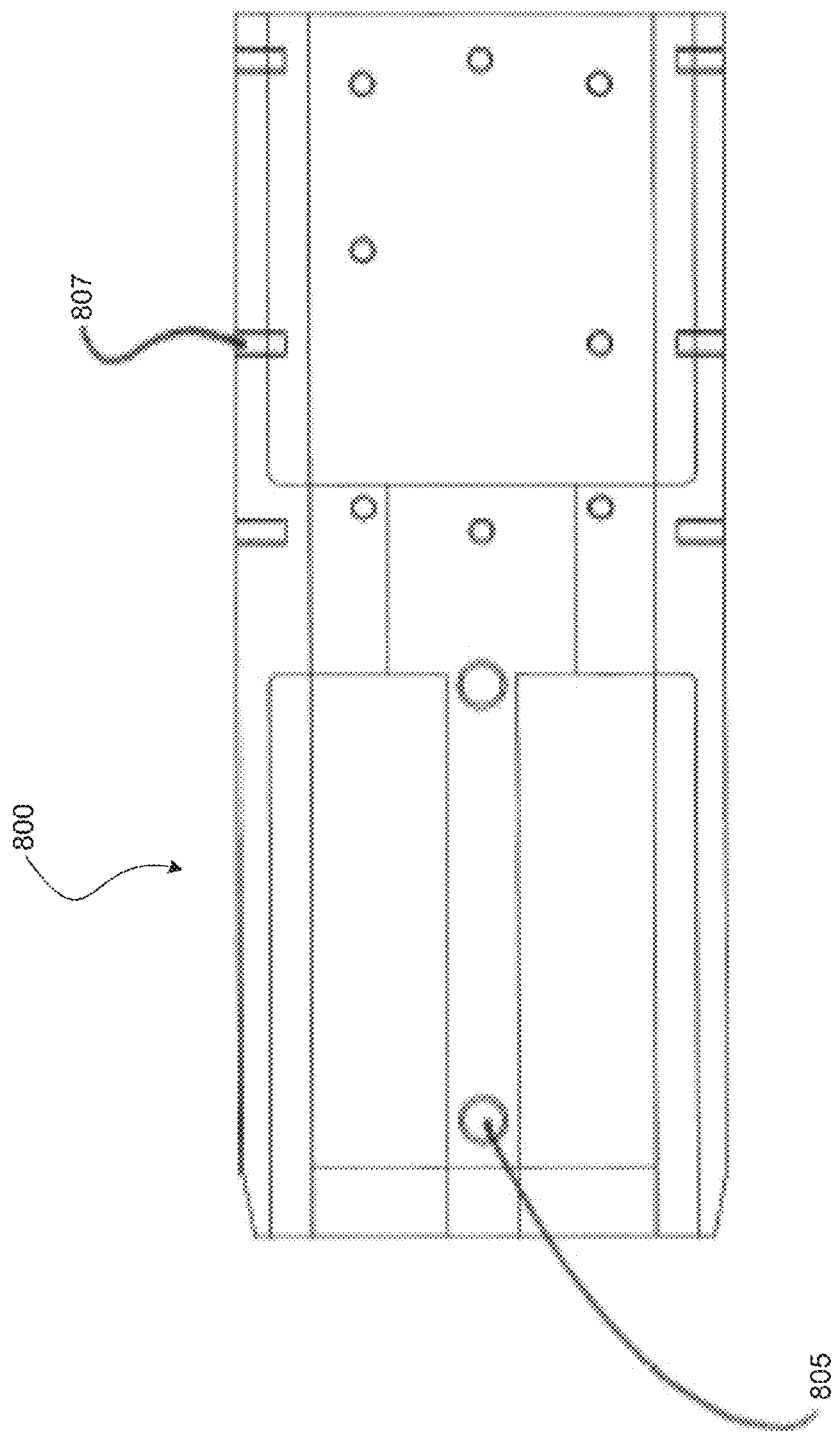
FIG. 8 is a side view of a connector shown in FIGS. 6 and 7.
Figure 9:
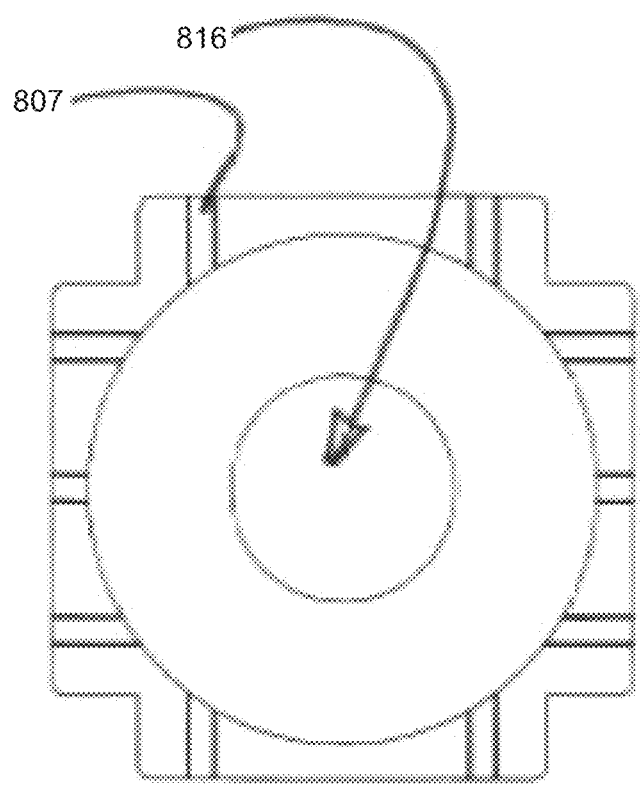
FIG. 9 is a front view of the connector shown in FIG. 8.
Figure 10:
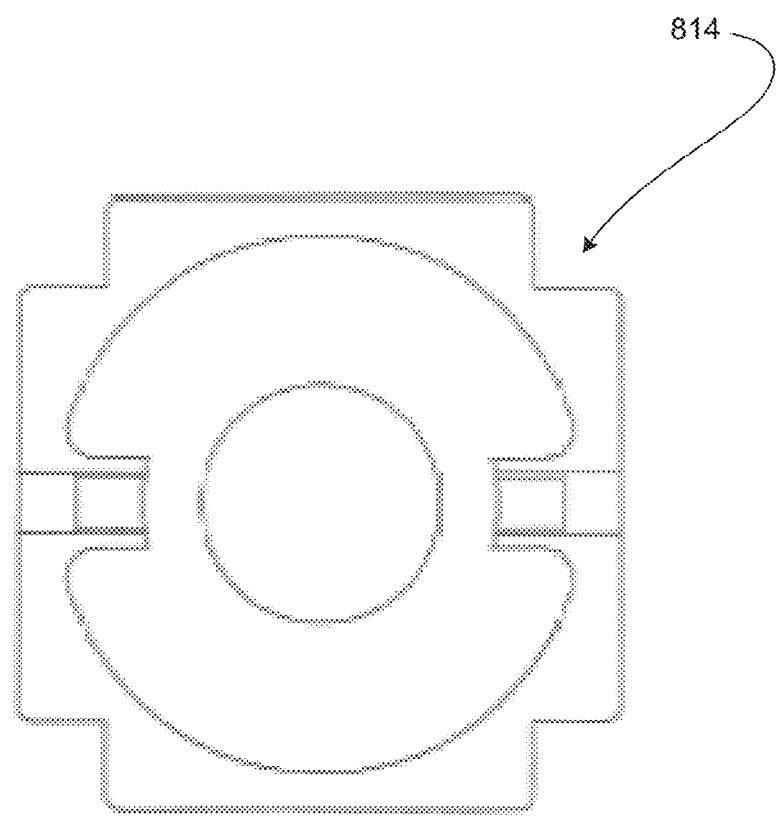
FIG. 10 is a rear view of the connector shown in FIG. 8.
Figure 11:
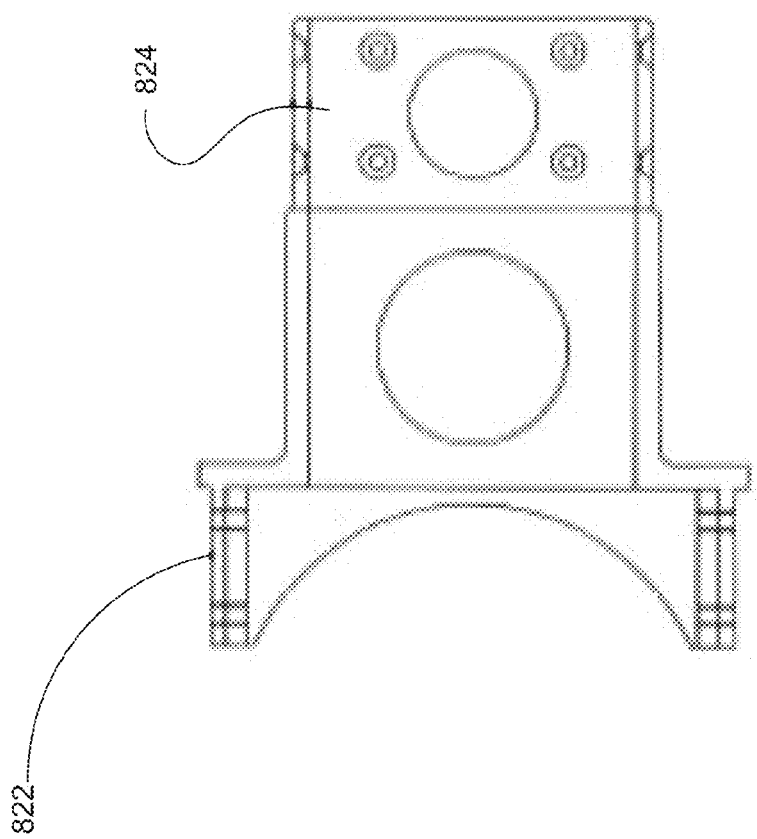
FIG. 11 is a side view of the nose adapter shown in FIGS. 6 and 7.
Figure 12:
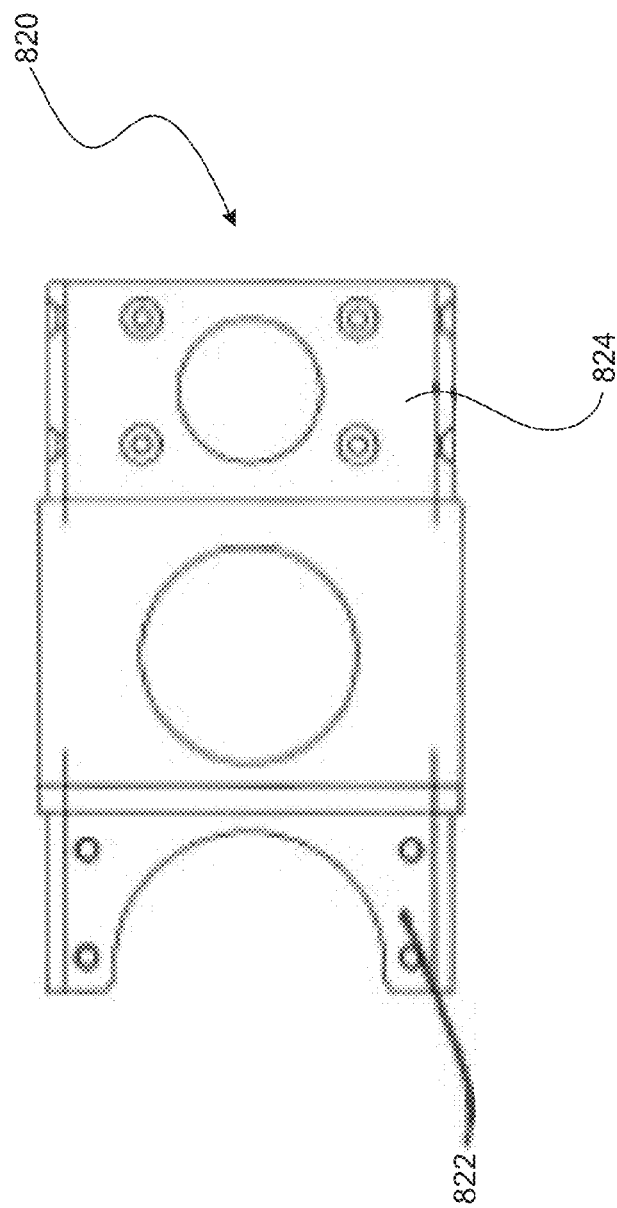
FIG. 12 is a top view of the nose adapter shown in FIG. 11.
Figure 13:
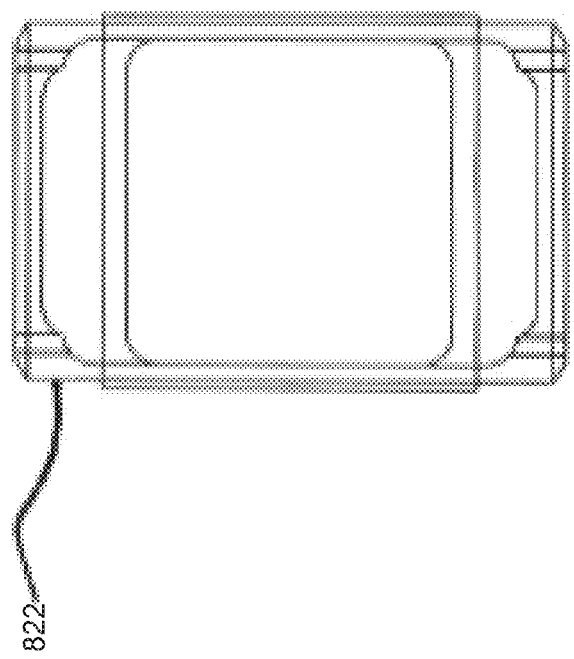
FIG. 13 is a rear view of the nose adapter shown in FIG. 11.
Figure 14:
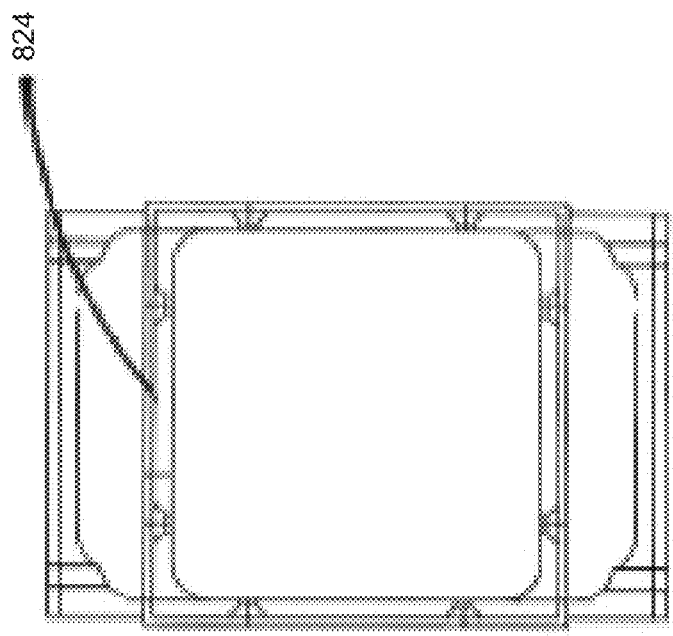
FIG. 14 is a front view of the nose adapter shown in FIG. 11.

As shown in FIG. 6, the fifth tube 510 is divided into a back segment 802 and a front segment 804 about 3-5 times longer than the back segment. For example, if the fifth tube has a total length of 20 feet, the front segment 804 may be 15-18 feet and the back segment may be 2-5 feet long. The front and back segments are attached to each other by a connector 800 that fits within the segments. As shown in FIGS. 8-10, the connector 800 may have rear release holes 805 and front segment holes 807. Corner cutouts 814 may be provided, forming a generally cruciform shape, to fit over the tracks 532 and 534.

A through hole 816 may extend through the connector to allow electrical cables to run through the inside of the arm. The connector 800 may optionally be substantially permanently attached into the back end of the front segment 804 via bolts 812 passing the walls of the fifth tube and threaded into the tube holes 807. The back end of the connector 800 is fit within the front end of the back segment 802 and is secured in place via connector bolts 806.

Figure 7:
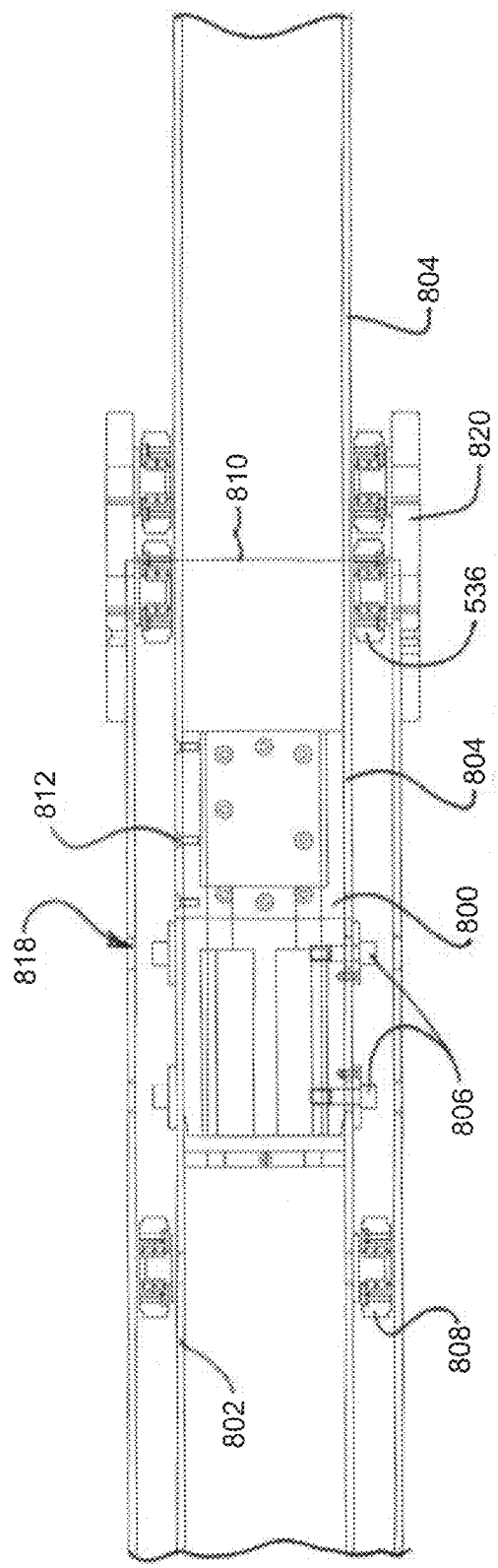
FIG. 7 is a top section view taken along line 7-7 of FIG. 6.

The crane arm shown in FIG. 6 having the divided fifth tube 510 operates in the same way, and with the same payload capacity and telescoping movement as the crane described in U.S. Pat. No. 8,033,742 which has an un-divided tube. However, the crane shown in FIG. 6 may be readily converted to provide greater payload capacity (along with less telescoping movement). The nose assembly 700 is unbolted and removed from the front end of the fifth tube 510. Referring to FIGS. 6 and 7, the connector bolts 806 which attach the connector to the back segment 802 are removed using a wrench inserted through access holes 818 in the side walls of the fourth tube 508. The front segment 804 is then separated and removed from the rear segment 802. This may be achieved via two personnel holding and pulling the front segment forward. The rear segment 802 is held in place by the cables 540 and 542 and remains within the fourth tube 508. Since the cables 540 and 542 are attached to the rear segment 802, no changes to the cable connections are needed. Additional rollers may be provided on the fourth tube so that the spacing between the rollers is close enough to continuously support the rear segment.

Figure 15:
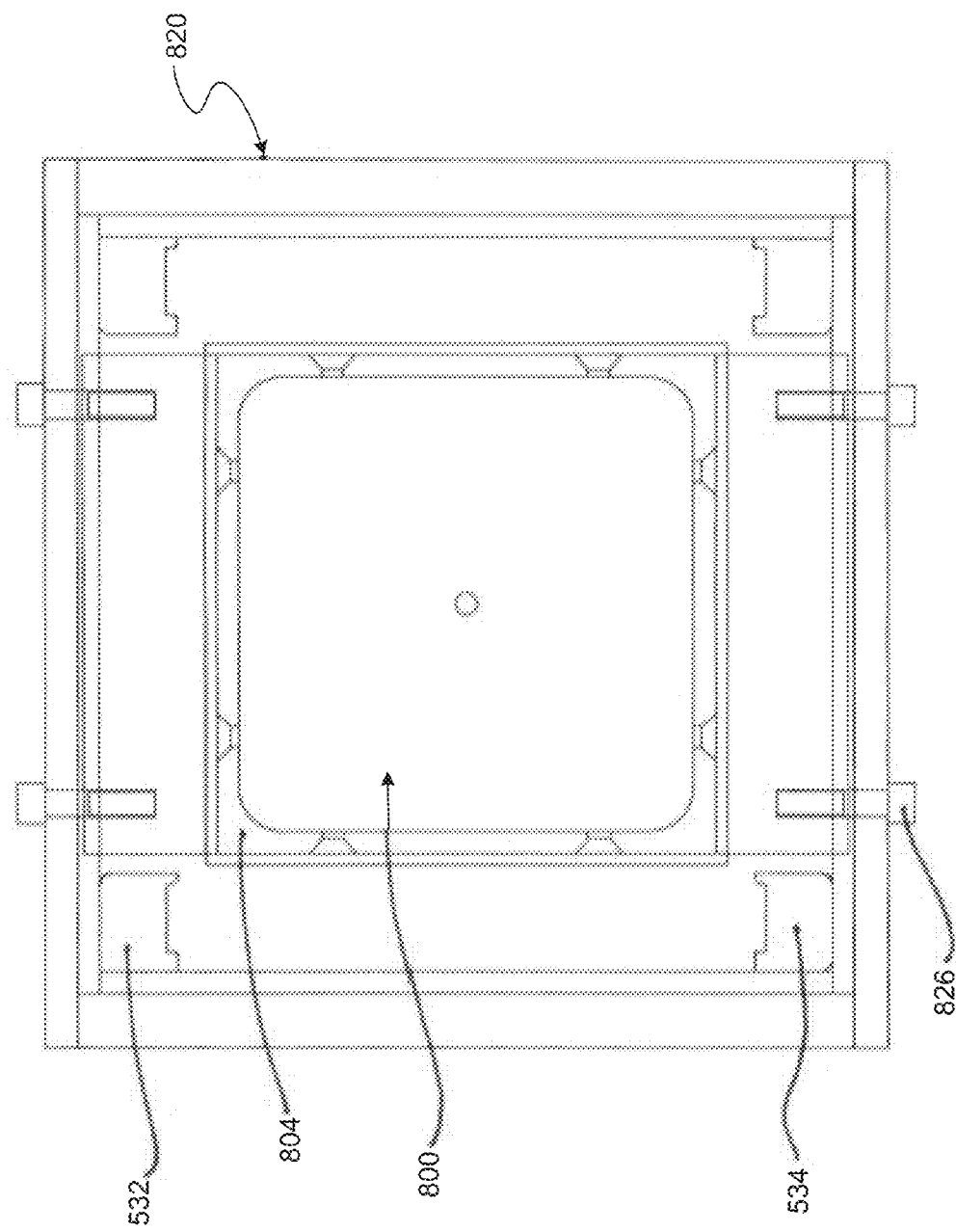
FIG. 15 is a section view taken along line 15-15 of FIG. 6.
Figure 16:
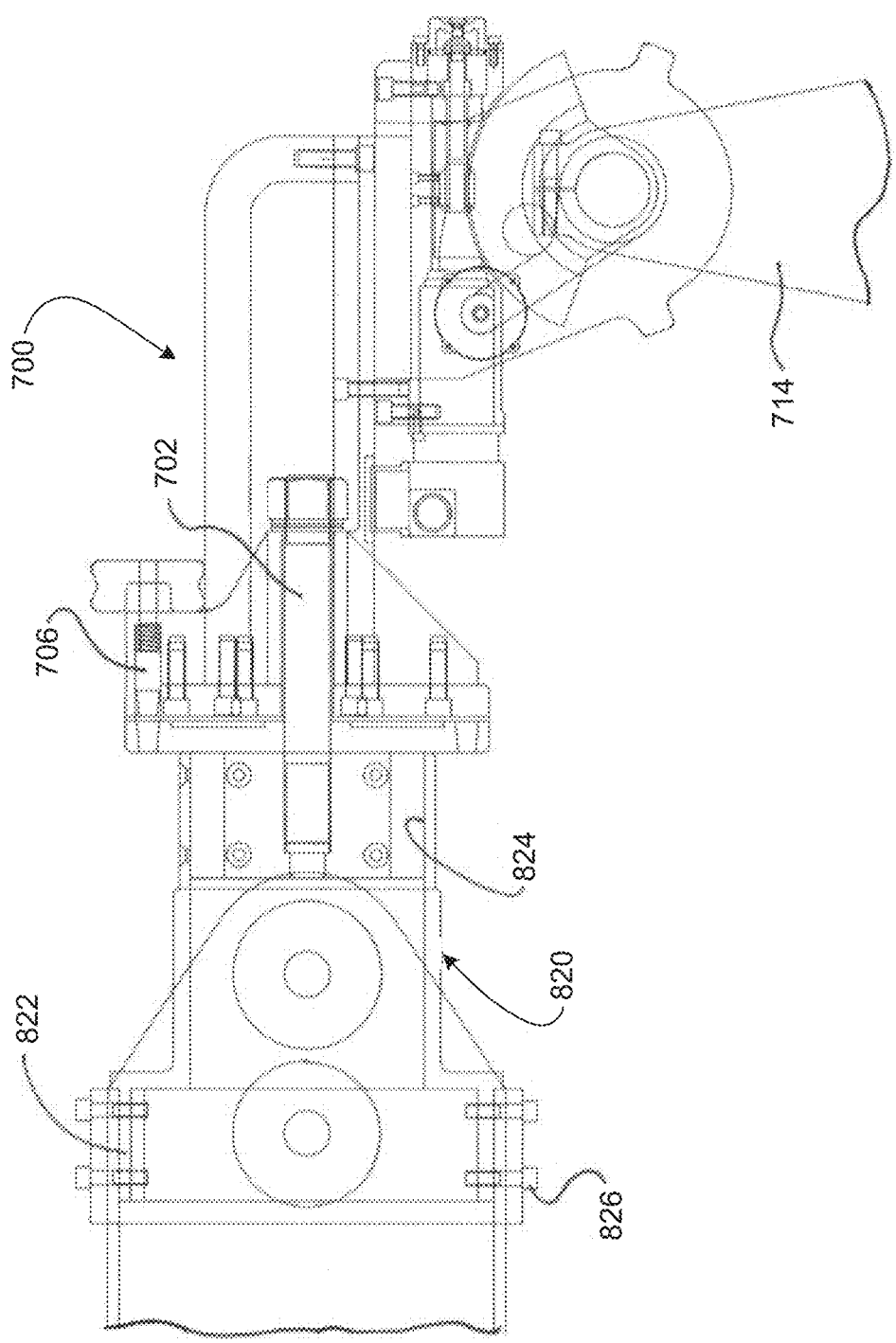
FIG. 16 is a side view of the nose assembly shown in FIG. 5 now attached to the third telescoping section of the crane arm.

After the front segment 804 is removed, an adapter 820 is attached onto the front end of the fourth segment 508. As shown in FIGS. 11-14, the nose adapter 820 may have a rear flange 822 dimensioned to slide into the front end of the fourth tube, and a front adapter fitting 824 dimensioned to fit into the back end of the nose assembly 700. The nose adapter may have holes and cutouts to reduce weight. As shown in FIGS. 15 and 16, the rear flange 822 may be bolted into the front end of the fourth tube 508 and the front adapter fitting bolted into the nose assembly 700. The nose assembly is then supported on the fourth tube, rather than on the fifth tube. This increases the payload of the crane arm from about 230 lbs to over 400 lbs, as the arm is shorter, the fourth tube has a bending moment of inertia far greater than the fifth tube, and the weight of the front segment 804 (e.g., about 200 lbs.) is removed. Reconfiguring the crane arm by removing the front segment, installing the nose adapter 820, and attaching the nose assembly 700 to the nose adapter, can typically be achieved by two people in about 20-30 minutes.

In use with this configuration, the crane arm has a payload capacity of over 400 lbs and 75% of the telescoping movement of the crane described in U.S. Pat. No. 8,033,742. As the crane arm extends and retracts, the second, third and fourth segments move telescopically in the same way as the crane described in U.S. Pat. No. 8,033,742. The rear segment 802 correspondingly also moves telescopically within the fourth tube without carrying any load. Rather, the rear segment moves over the same length stroke as the fifth tube in the crane described in U.S. Pat. No. 8,033,742. However, because the rear segment is short, it does not extend out of the front end of the fourth tube 508, even when the arm is fully extended and the rear segment 802 is at its fully forward position. To return the crane arm back to its original configuration, the steps above are reversed.

The design described above using the split tube together with the connector and the nose adapter may be used on various types of telescoping cranes having one or more telescoping tubes or sections, to quickly and temporarily reconfigure the crane arm to increase the maximum payload capacity. It may also be used to provide a more rigid crane arm, even for use with light payloads.

The nose assembly 700 as shown in FIG. 5 is shown with an overslung right angle support attached to the camera frame 714. However the nose assembly may have various other designs, and may optionally be replaced by any type of plate, frame or bracket having an attachment fitting such as fitting 705 for attaching it to the front end of the front or smallest diameter tube, and with the attachment fitting also used for attaching it to the adaptor 820. Various mechanical equivalents of the fitting 705 may be used, as the fitting need only be able to attach the nose assembly, camera bracket or other support component onto the front end of the telescoping tube and to the adapter 820, with or without using intermediate components, such as spacers, risers, extension plates, drop down plates, adapter plates, etc.

Figure 17:
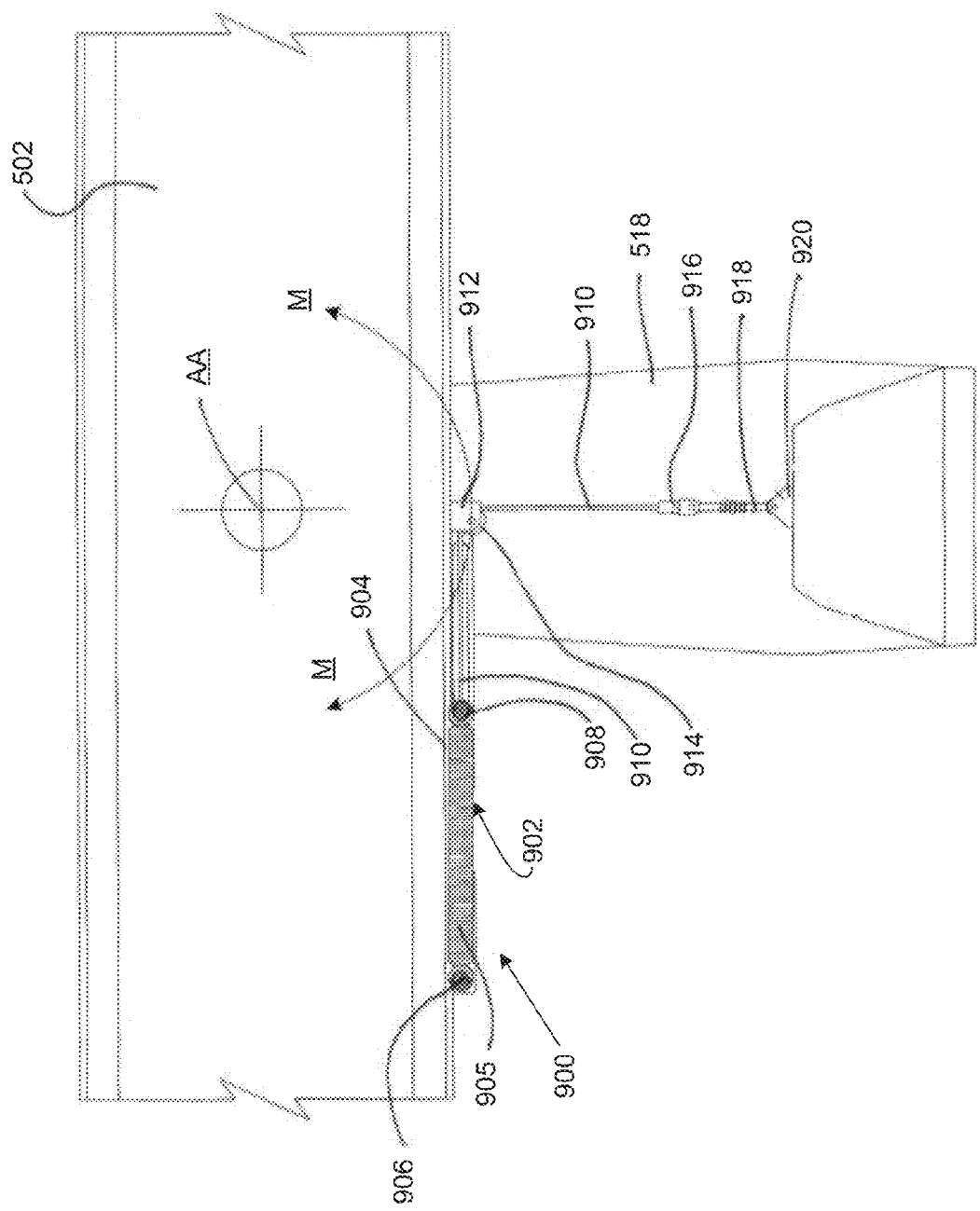
FIG. 17 is a side view of a spring balancing system on the crane arm shown in FIGS. 1-4.
Figure 18:
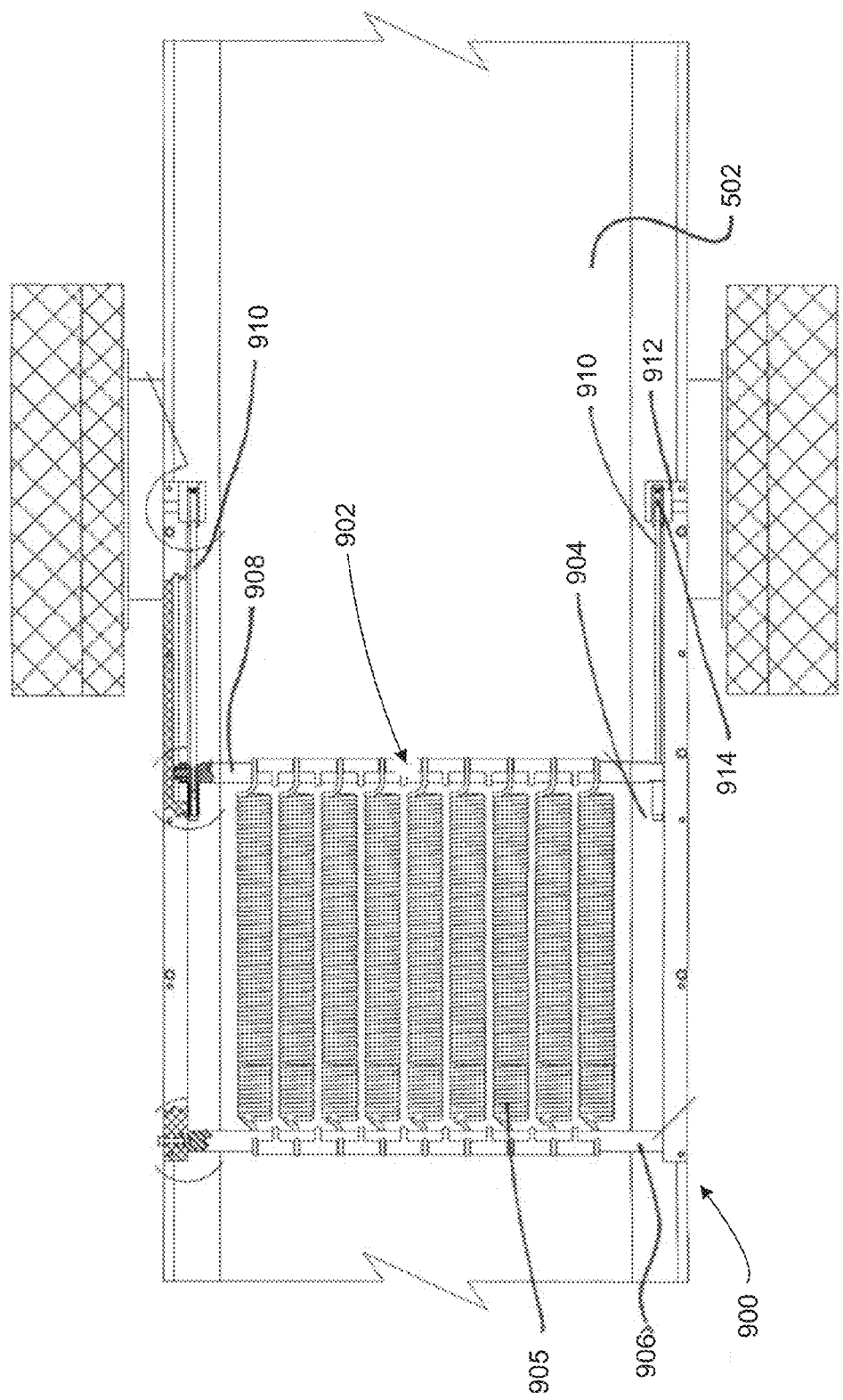
FIG. 18 is a bottom view looking up at the spring balancing system of FIG. 17.
Figure 19:
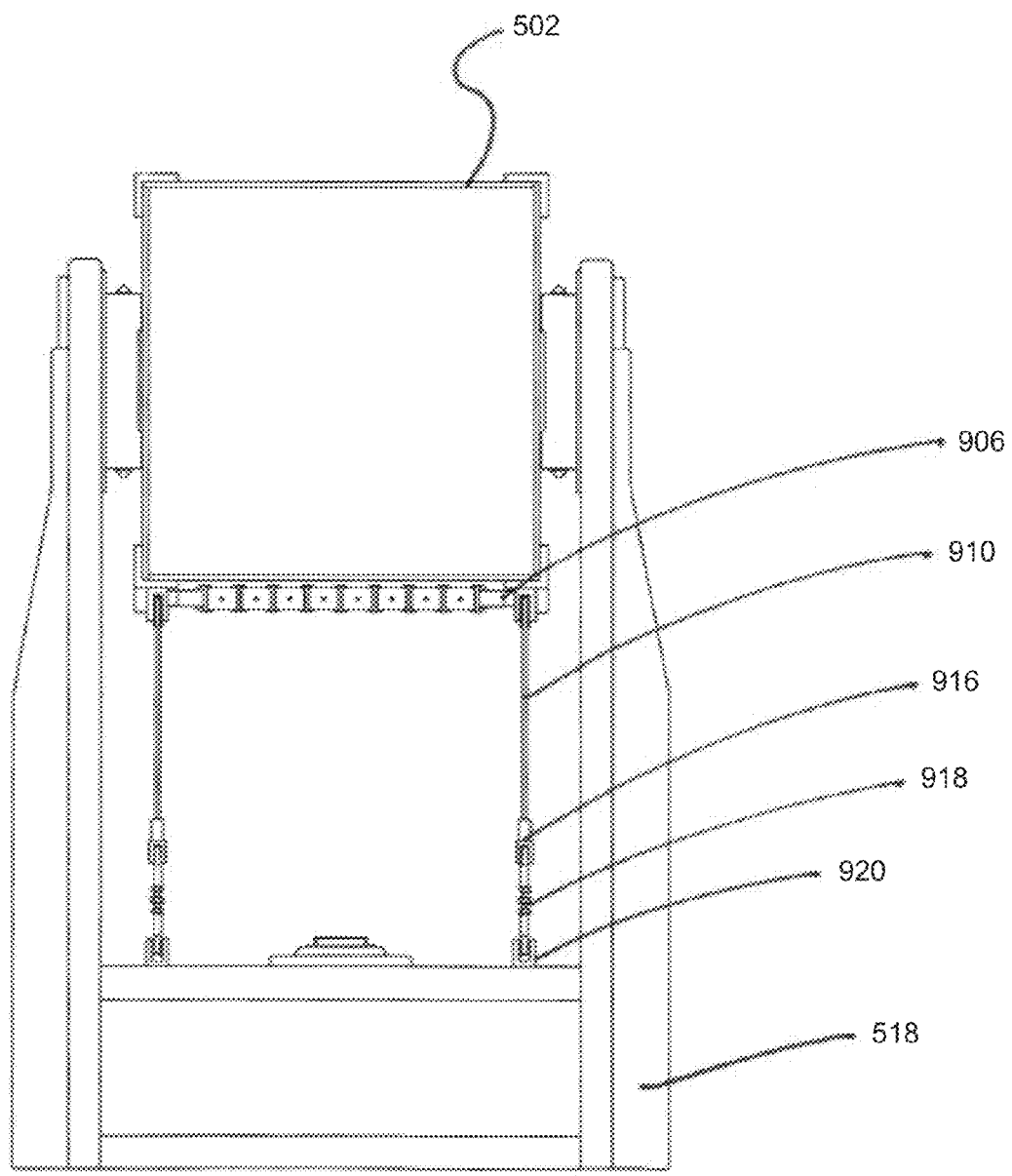
FIG. 19 is a back view looking forward of the spring balancing system shown in FIGS. 17 and 18.

FIGS. 17-19 show a spring balancing system 900 which may be used on the telescoping crane arm 501, to better keep the arm 501 balanced as the elevation angle of the arm changes. The spring balancing system 900 includes a spring assembly 902 attached onto the bottom surface of the fixed tube or section 502. Specifically a spring frame or guide 904 may be bolted onto the bottom surface of the first tube 502, adjacent to the column 518. The spring assembly 902 includes a plurality of tension springs 805 attached between a fixed back bar 906 and a movable front bar 908. On each side (left and right) of the spring assembly 902, a cable 910 is attached to the front bar 908, extend around a pulley 914 and is attached to the column 518, optionally via a clevis 916, a turnbuckle 918 and an anchor plate 920. The pulley 914 is rotatably attached to the bottom surface of the tube 502 via a bracket 912.

FIG. 17 shows the crane arm 501 is the level horizontal position. The springs 905 are pre-tensioned, optionally via the turnbuckles. As the arm 501 is rotated up or down, away from horizontal, the pulley 914 moves along the arcuate path shown by the double arrow MM in FIG. 17. This movement, in either direction, causes the springs to stretch and exert a force on the arm acting to return the arm back to the horizontal position. Specifically, as the arm 501 is moved away from the horizontal, the spring force exerts a moment about the arm pivot axis AA. The moment or torque exerted by the spring force acts in the direction opposite to the out-of-balance force resulting from the change in the shape of the arm with a change in elevation angle of the arm. As a result, the spring balancing system 900 compensates for out-of-balance forces that arise from changes in the elevation angle of the arm. In the example shown, the out-of-balance force can approach 65 pounds. The spring balancing system 900 reduces the percipient out-of-balance force down to only a few pounds, to the extent that even a small amount of friction in the crane is sufficient to hold the arm in place. In contrast, in the same design but without the spring balancing system, the crane operators would need to lift up or pull down on the back end of the crane arm with up to 65 pounds to keep the arm balanced. The spring balancing system 900 accordingly makes the crane arm 501 much easier to control.

The spring balancing system 900 may be permanently installed on the crane arm 501. The crane arm 501 may be set up with an internal balance design for most typical payloads typically centered around 185 pounds, including the camera head and camera. This may be achieved by providing counter weights at the back end of the arm, at the factory or service center. Consequently, at the filming location, after the payload is attached to the arm, no balancing is needed. This avoids the time, effort and risks associated with manually loading counterweights onto the back end of the crane at the filming site. Of course, if the payload weight deviates significantly from the 185 pound design target weight, then counterweights must be manually added to the front or back of the crane arm, as needed. However, even then the number of counterweights will be minimized in comparison to conventional balanced cranes.

The spring assembly 902 nominally exerts a compensating force substantially equal to the out-of-balance force. The out-of-balance force varies with the design parameters of the crane arm. Arms that are less stiff and have more sag also have more out-of-balance force. In the example shown, nine springs are used, each having a spring constant of about 10 pounds per inch, and set up for a maximum extension of about seven inches, and a correspondingly maximum compensating spring force of about 600 pounds acting around the pivot axis AA on a moment arm of about 10-12 inches.

As shown in FIG. 17, the springs are parallel and adjacent to the bottom surface of the tube 502. This provides a highly compact design. It also avoids interfering with movement of the counterweight carrier along the top and sides of the tube 502.

Thus, a novel camera crane has been shown and described. Changes and substitution may of course he made without departing from the spirit and scope of the invention. The invention, therefore, should not be limited, except to the following claims and their equivalents.

The invention claimed is:

1. A telescoping camera crane comprising:
a first section and a second section telescopically extendible into and out of the first section;
the second section divided into a front segment attached to a back segment by a connector, to allow the front segment to be removed from the back segment;
an adapter attached to the front end of the first section; and
a camera support having a fitting adapted to attach onto the adaptor and onto a front end of the front segment.

2. The camera crane of claim 1 with the front segment having a length 3-6 times greater than the back segment.

3. The camera crane of claim 1 further comprising one or more cables attached to a back end of the back segment.

4. The camera crane of claim 1 with the connector having a cross section substantially the same as a cross section of the first section.

5. The camera crane of claim 1 with connector substantially permanently attached to the back end of the front segment, and with the connector attached to the back segment via removable bolts, to allow the front segment to be removed from the back segment.

6. The camera crane of claim 1 with the camera support comprising a nose assembly including an attachment fitting for attaching the nose assembly onto the front end of the second section or onto the adapter.

7. A camera crane comprising:
a first arm section;
a second arm section telescopically extendible from the first arm section;
a third arm section telescopically extendible from the second arm section, with the third arm section including a front segment attachable to and removable from a back segment;
a cable and pulley system associated with the second and third arm sections for telescopically extending and retracting the second and third arm sections;
a counter weight carrier movable along the first arm section and linked to the cable and pulley system;

an adapter attachable to the front end of the second section; and a camera support attachable to either of the adapter and a front end of the front segment.

8. The camera crane of claim 7 further comprising a connector attaching the front segment to the back segment, with the connector inside of the front segment and the back segment.

9. The camera crane of claim 8 further comprising roller guides attached at the inside corners of the front and back segments, and with the connector having corner cutouts dimensioned to allow the front and back segments to fit onto the connector.

10. A camera crane comprising:
a first tube;
a second tube telescopically extendible from the first tube;
a third tube telescopically extendible from the second tube;
a fourth tube telescopically extendible from the third tube;
a fifth tube telescopically extendible from the fourth tube, with the fifth tube divided into a front segment and a back segment;
a cable and pulley system associated with the first, second, third, fourth and fifth tubes, for telescopically extending and retracting the tubes;
a counter weight carrier movable along the first tube and linked to the cable and pulley system;
a drive system connected to the counter weight carrier;
an adapter attachable to a front end of the fourth tube; and
a camera platform having an attachment fitting attachable to a front end of the fifth tube and to the adapter.

11. The camera crane of claim 10 with the camera platform comprising a nose assembly including a head pivotally attached to a nose assembly base and a leveling system on the nose assembly base.

12. A camera crane comprising:
a first tube pivotally attached onto a pedestal;
a second tube telescopically extendible into and out of the first tube;
a spring assembly on a bottom surface of the first tube, with the spring assembly including a plurality of springs;
at least one cable extending around an idler attached to the bottom surface of the first tube, with the at least one cable having a first end attached to the pedestal, and a second end attached to the springs.

13. The camera crane of claim 12 with the at least one cable having a vertical segment between the pedestal and the pulley, and a horizontal segment between the pulley and the bar, when the first tube is horizontal.

14. The camera crane of claim 12 further comprising two cables, with each cable attached adjacent to an end of the bar.

15. The camera crane of claim 12 with the first tube pivotally attached onto the pedestal about a pivot axis, and with the pulley having a center axis vertically aligned below the pivot axis.

16. The camera crane of claim 12 with the plurality of springs adjacent and parallel to the bottom surface of the first tube.

17. The camera crane of claim 12 with the springs and cable pre-tensioned and exerting a compensating force on the first tube whenever the first tube is in a non-horizontal orientation.

18. The camera crane of claim 12 with the idler comprising a pulley rotatably attached to the bottom surface of the first tube.

19. The camera crane of claim 12 with each spring having a first fixed end and a second end attached to a bar, and with the cable attached to the bar.

20. A telescoping camera crane comprising:
a first section and a second section telescopically extendible into and out of the first section;
the second section divided into a front segment attached to a back segment by a connector, to allow the front segment to be removed from the back segment, and with the front segment having a length 3-6 times greater than the back segment;
an adapter attached to the front end of the first section; and
a camera support attachable onto the adapter and onto the front segment.

21. A camera crane comprising:
a first arm section;
a second arm section telescopically extendible from the first arm section;
a third arm section telescopically extendible from the second arm section, with the third arm section including a front segment attachable to and removable from a back segment;
a system associated with the second and third arm sections for telescopically extending and retracting the second and third arm sections;
an adapter on the front end of the second section; and
a camera support attachable to the front end of the front segment, to provide a camera crane having a first maximum reach and a first maximum payload capacity, and with the camera support also attachable to the adaptor with the front segment removed from the back segment, to provide a camera crane having a second maximum reach and a second maximum payload, with the second maximum reach less than the first maximum reach and with the second maximum payload greater than the first maximum payload.

* * * * *